A. JAMINET.
ILLUMINATED ADVERTISING VEHICLE ROOF.
APPLICATION FILED JUNE 24, 1916.
1,232,037.
Patented July 3, 1917.
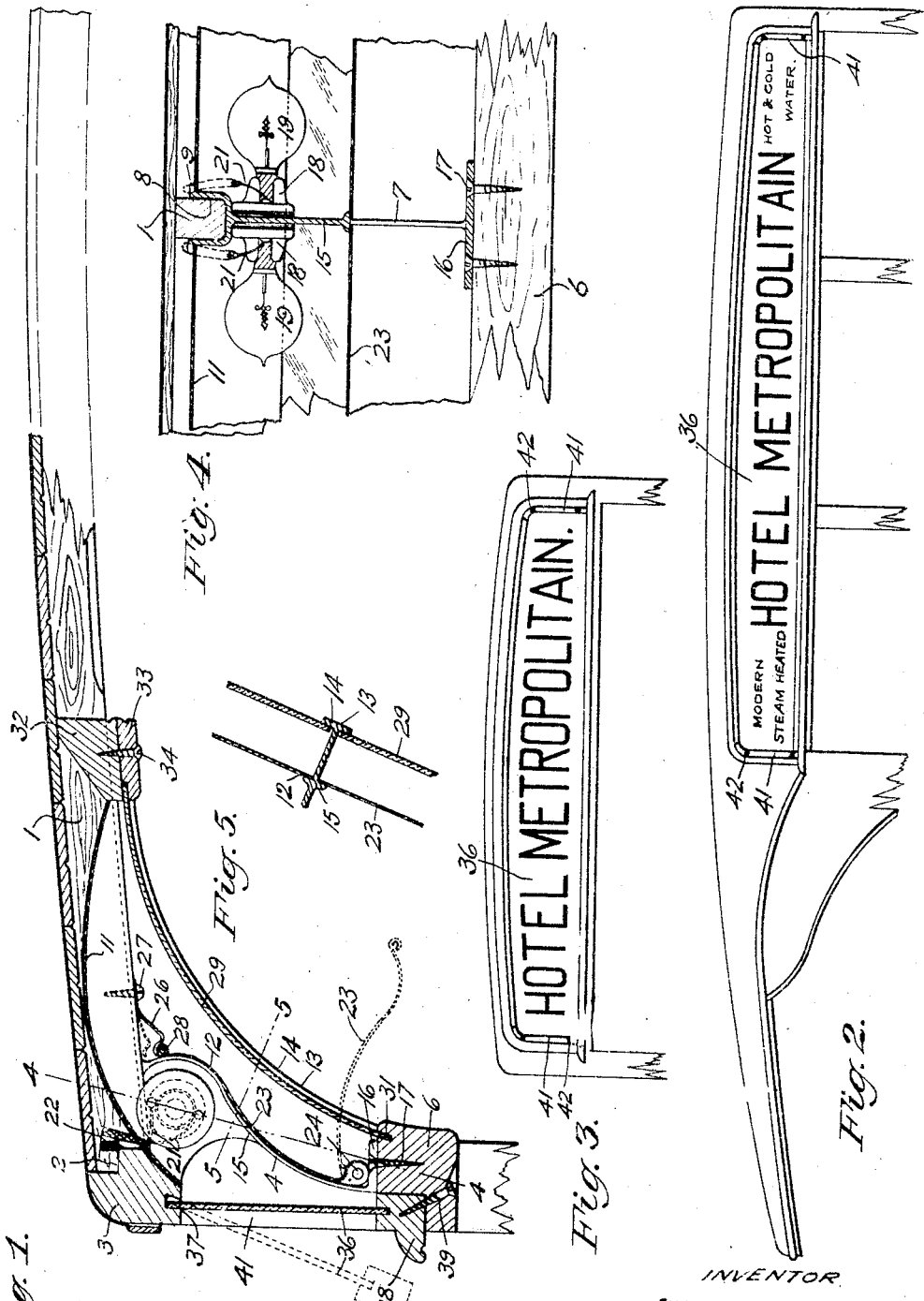
INVENTOR
AUGUSTE JAMINET,
BY F. M. Wright
ATTORNEY

UNITED STATES PATENT OFFICE.

AUGUSTE JAMINET, OF SAN MATEO, CALIFORNIA.

ILLUMINATED ADVERTISING VEHICLE-ROOF.

1,232,037.　　　　　Specification of Letters Patent.　　　Patented July 3, 1917.

Application filed June 24, 1916.　Serial No. 105,620.

*To all whom it may concern:*

Be it known that I, AUGUSTE JAMINET, a subject of the Grand Dutchess of Luxemburg, residing at San Mateo, in the county of San Mateo and State of California, have invented new and useful Improvements in Illuminated Advertising Vehicle-Roofs, of which the following is a specification.

The present invention relates to an illuminated advertising vehicle roof.

The main object of the invention is to construct in a vehicle roof a long, unbroken, transparent, illuminated, advertising or destination outside sign.

A further object is to provide a practical construction of roof which will be strong and substantial despite the shortening or cutting away of the center posts or pillars, which cutting away is found necessary to provide the aforesaid long, unbroken, transparent sign.

A further object is to provide, in conjunction with the outside sign, a plurality of inside signs, lighted by the same lamp.

In the accompanying drawing, Figure 1 is a cross-sectional view of a portion of a vehicle roof and an upper portion of the side of the vehicle, constructed in accordance with my invention; Fig. 2 is a broken side view on a reduced scale of the upper portion of a vehicle equipped with my invention; Fig. 3 is a similar end view of the same; Figs. 4 and 5 are cross sectional views on the lines 4—4 and 5—5 respectively of Fig. 1.

Referring to the drawing, 1 indicates a cross beam of the roof of car supported at its ends, as shown at 2, upon upper longitudinal rails 3 (one only being here shown). Each cross beam 1 and also the upper rail 3 are supported by brackets 4 resting upon a lower rail 6. Each bracket 4 comprises a main web portion 7, narrow at the bottom, and wide and grooved, as shown at 8, at the top to receive the cross beam 1. Each side of the groove 8 has at the top outwardly extending flanges 9, by means of which there are supported the edges of concave reflectors 11, one on each side of the bracket. The outer edge 12 of said bracket is of an ogee form and its inner edge 13 has flanges 14 and is in the form of a long curve, concave to the interior of the vehicle. Said bracket is also formed with a thickened portion or double rib 15, which extends upwardly at some distance along the outer edge of the bracket and then continues in an ogee form on an intermediate portion of the bracket, terminating at the groove 8. At the lower end of the bracket said thickened portion 15 widens out on each side of the bracket to form feet 16, which are secured by screws 17 to the lower rail 6. Formed integral with, or secured to, said bracket on each side thereof and outside of the upper portion of the ogee thickened portion or rib 15 is a lamp socket 18, and in each socket is an electric lamp 19, the wires 21 of which extend around the upper grooved portion of said bracket and then longitudinally of the vehicle in a recess 22 therefor concealed by the reflectors 11. As shown at 24, a reflector 23 is pivoted along its lower edge to the brackets 4, with its ends held adjacent to the thickened portions or ribs 15 by springs 26 secured by screws 27 screwed into the grooved portions of the brackets and also into the cross beams, the free ends of the springs engaging the beaded free edge 28 of the reflector 23.

Supported by the flanges 14 of the bracket are the edges of curved sheets 29 of glass on which are painted advertising signs, the lower edge of each sheet being received in a groove 31 in the lower rail 6 and the upper edge being received in a recess in a longitudinal molding 33 secured by screws 34 to a longitudinal beam 32, the upper side of which is grooved to receive the cross beams.

An outside glass sheet 36 extends almost the full length of the main body of the vehicle and its upper edge is contained in a groove 37 formed in the lower edge of the upper rail 3, while its lower edge is permanently secured in a molding 38 secured by screws 39 to a rabbet on the lower rail 6. Said sheet 36 is removable by unscrewing the screws 39, and swinging the lower edge outwardly while the upper edge is still retained within the groove 37, which groove is widened at the top to permit said swinging movement to take place. The glass sheet is then drawn outward out of the groove. However, to permit of the removal of the sheet in this way, the ends of the sheet are concealed by removable strips 41, secured by screws 42 to the upper rail 3. This construction enables a water-proof joint to be obtained between the outside translucent sheet and the frame of the vehicle.

The outer edges of the brackets 4 are withdrawn as far as possible from the sheet 36 in order that the lamps may illuminate the parts of the sheet directly opposite the brackets, and the illumination may thus be continuous.

It will be seen that with this arrangement the light from the lamps illuminates, directly and by double reflection by the mirrors 11 and 23, the long continuous sheet of glass 36 and a sign painted thereon, and also illuminates by reflection the inside curved sheets of glass 29 on which several signs are painted.

I claim:—

1. In a vehicle roof construction, a long uninterrupted outside translucent advertising or destination sheet, forming part of the body of a vehicle, a bracket opposite or adjacent to a mediate portion of the sheet supporting a roof of the vehicle above the sheet and supported upon the body frame below the sheet, suitably located lamps, and a reflector supported by said bracket and concave to said sheet and lamps.

2. In a vehicle having a roof, a bracket for supporting the roof from a wall of the vehicle, said wall having a translucent portion, and a plurality of devices for illumination said translucent portion from the inside of the vehicle, said bracket being spaced from said translucent portion to permit all parts of said translucent portion to be illuminated by said devices.

3. In a vehicle roof, the combination of an outer longitudinally extending vertically disposed translucent sheet, an inner longitudinally extending sheet concave to the interior of the vehicle and supported by the roof and a side of a vehicle, a lamp between said sheets, an upwardly extending reflector concave to the lamp, and located on the side of the lamp remote from the outer sheet, and a horizontally extending reflector concave to the lamp and the inner sheet.

4. In a vehicle roof construction, a long uninterrupted outside translucent advertising or destination sheet, forming part of the body of the vehicle, a metallic bracket supporting the roof above the sheet its lower end being supported upon the body frame, a reflector supported by said bracket, an inner translucent advertising sheet supported by said bracket, suitably located lamps, and reflectors also supported by said bracket and reflecting the light from the lamps on to said translucent sheets.

5. In a vehicle roof, the combination of an outer longitudinally extending vertically disposed translucent sheet, an inner longitudinally extending sheet concave to the interior of the vehicle and supported by the roof and a side of a vehicle, a lamp between said sheets, an upwardly extending reflector concave to the lamp, and located on the side of the lamp remote from the outer sheet, a horizontally extending reflector concave to the lamp and the inner sheet, and a bracket forming a rigid connection between the roof and a side of the vehicle and spaced from the outer sheet to permit of placing in position adjacent to said side a long unbroken translucent sheet.

AUGUSTE JAMINET.